Feb. 7, 1967    E. H. MAHONEY    3,303,501
RADIO LOCATION SYSTEM WITH LANE IDENTIFICATION FACILITIES
Filed April 22, 1964    2 Sheets-Sheet 1
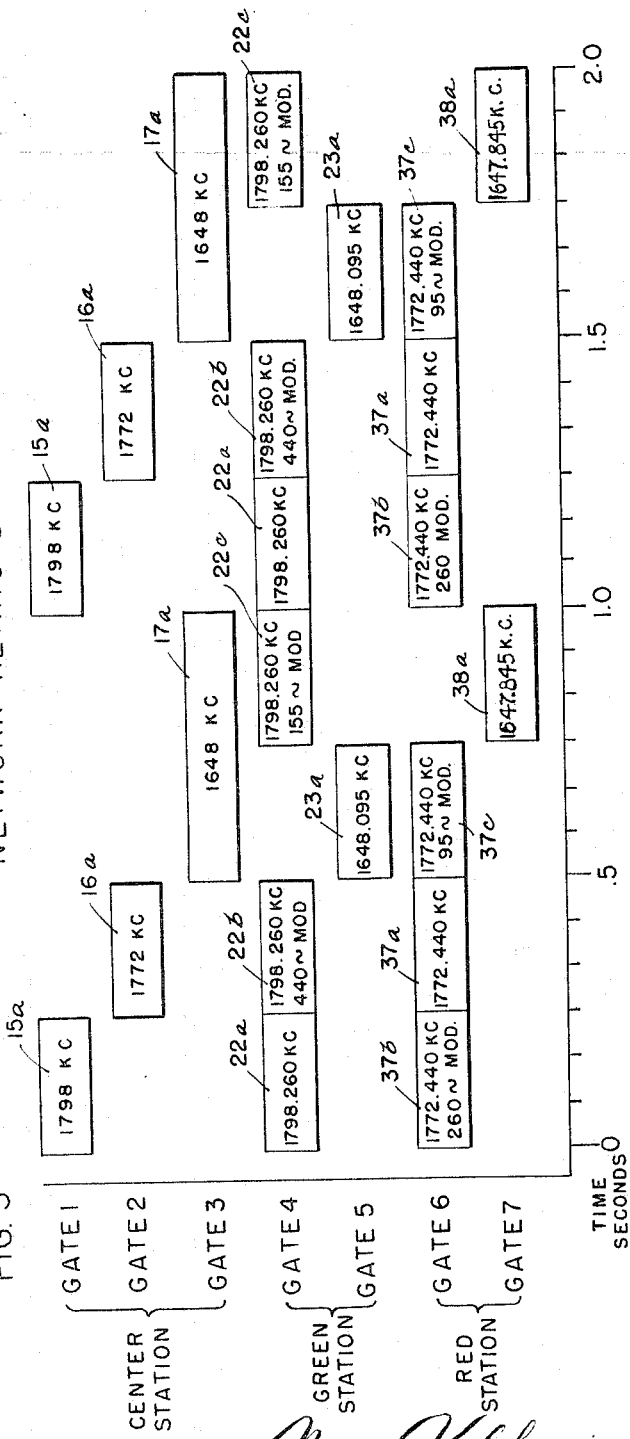
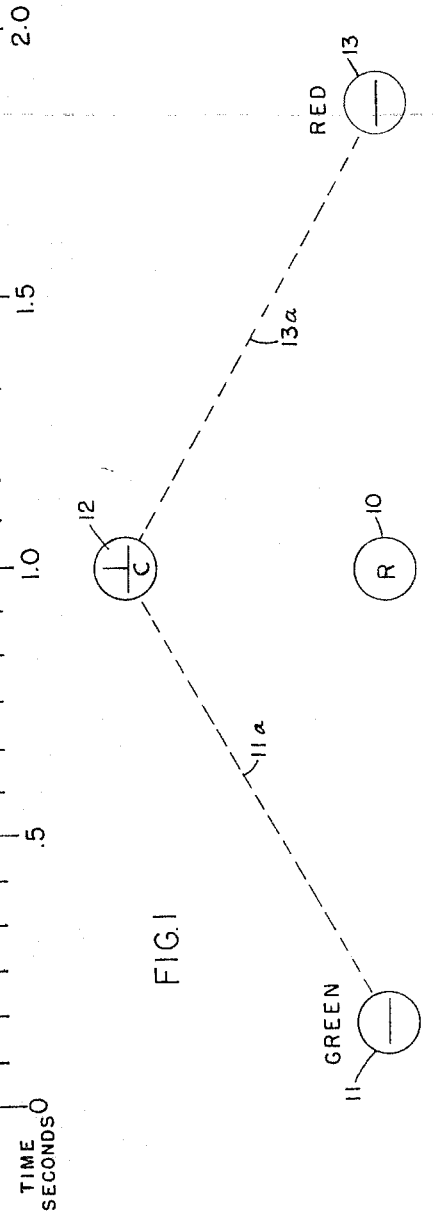
INVENTOR:
EDWARD H. MAHONEY
BY
Mason, Kolehmainen, Rathburn & Wyss
ATT'YS

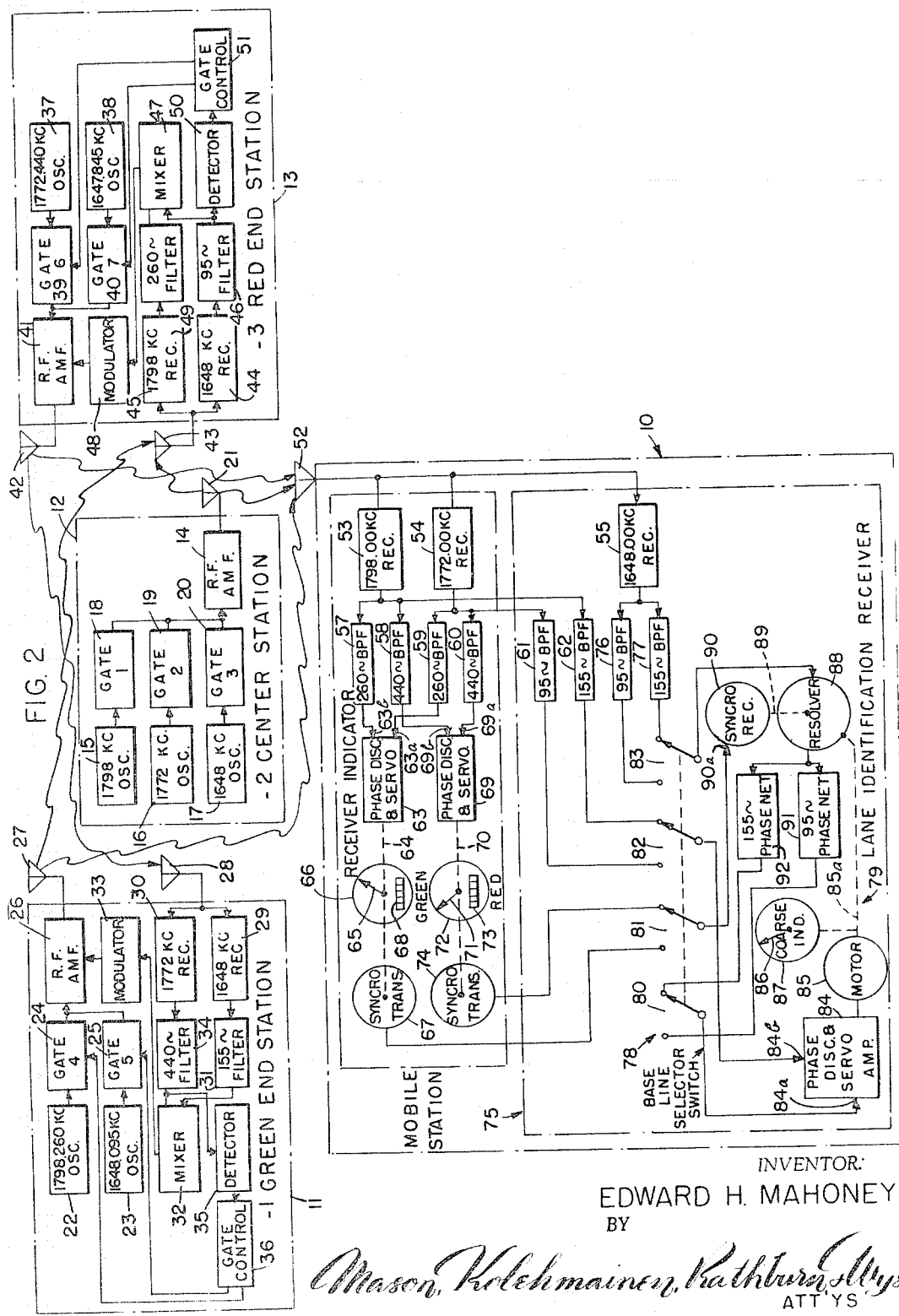

3,303,501
RADIO LOCATION SYSTEM WITH LANE
IDENTIFICATION FACILITIES
Edward H. Mahoney, Tulsa, Okla., assignor to Seismograph Service Corporation, Tulsa, Okla., a corporation of Delaware
Filed Apr. 22, 1964, Ser. No. 361,748
22 Claims. (Cl. 343—105)

The present invention relates generally to radio position determining systems and is more particularly concerned with improvements in radio position finding systems of the hyperbolic continuous wave type employing phase comparison in pairs of position indicating signals radiated from a plurality of spaced transmitting points to provide one or more indications from which the position of a mobile receiving point relative to the known locations of the transmitters may be determined very accurately. The invention is particularly concerned with a new and improved system of the above type which is provided with apparatus for retrieving lane identification which may be lost as a result of system failures in the receiving or transmitting equipment or by weak signal areas caused by local conditions adversely affecting radio wave propogation.

In systems of the particular type referred to, the continuous waves radiated from each pair of transmitters bear a phase relationship at the mobile receiving unit which changes as a function of the changing position of the latter unit relative to the transmitting points. More specifically, the waves radiated by each pair of transmitting units of the system are characterized by isophase lines which are hyperbolic in contour about the transmitting points as foci. With this system arrangement, the position of a receiving point relative to a pair of hyperbolic isophase lines may be determined by measuring the phase relationship between waves radiated from the pairs of transmitters. Since the point of location of the receiving point along the zone separating the two isophase lines is not indicated by such a phase measurement, it is desirable to employ at least three spaced trannsmitters, different pairs of which function to provide a grid-like pattern of intersecting hyperbolic inphase lines in order to obtain a position fix providing an absolute determination of the position of the receiving point.

In Honore Patent No. 2,148,267 a system is disclosed in which the waves radiated from each pair of transmitters are heterodyned at a fixed linked transmitting point and the difference frequency between the heterodyned waves is modulated as a reference signal on the carrier wave output of the link transmitter for radiation to the receiving point where the difference frequency component is detected and phase compared with the difference frequency signal derived by directly heterodyning the transmitted continuous waves arriving at the receiving point from the pair of transmitters. In this manner any phase shifts between the continuous waves radiated from the two transmitters are completely compensated so that the measured phase angle is truly representative of the location at the receiving point between the pair of isophase lines. In Hawkins Patent No. 2,513,317 an improved system is disclosed wherein each of the end stations of the system alternately functions first as a position indicating signal transmitter and, second, as a reference or link transmitter for radiating reference signals to the mobile receiving point, thereby reducing the number of signal channels required as well as the amount of equipment and the number of transmitting sites necessary to provide a complete system.

A particular problem encountered in the operation of continuous wave systems of the type disclosed in the Honore and Hawkins patents is that of eliminating ambiguity from the phase measurements which provide the desired position information. Thus, while the two phase measurements identify the position of the receiving station relative to two intersecting pairs of hyperbolic isophase lines, they do not identify the particular pair of lines to which the indications are related. This means that in operating the system, the geographic location of the receiving point must be known at the start of movement of the receiver relative to the transmitting stations and furthermore that the successive wavelengths or lanes traversed must be counted as the receiving station is moved relative to the grid-like pattern of hyperbolic lines. It also means that a mobile craft entering the radiation pattern of the transmitters cannot utilize the radiated signal to determine its position without employing auxiliary equipment to determine the approximate position of the craft relative to the signal transmitters.

One means employed heretofore for identifying the lanes or grids has been to provide an integrating counter mechanism which adds or subtracts a digit when the phase indicator undergoes a change of 360 degrees. Since a lane is crossed whenever such a 360 degree change occurs, the lanes are continuously identified by the integrating counter while the phase indicator provides information concerning the precise position of the multiple receiver within the lane identified. A system of this type, however, requires continuous uninterrupted operation of the transmitting and receiving facilities since even relatively short periods of interrupted operation may result in the loss of one or more counts on the integrating counters if the mobile receiving unit moves during the period of interruption. Such interruptions might be caused by failure of the indicating, receiving or transmitting equipment for short periods of time or, in the alternative, by the presence of a weak signal area in the field pattern of the transmitting system. The presence of a weak signal area, which might be caused by local conditions adversely affecting radio wave propagation, renders the receiver insensitive to phase changes and, hence, the mobile unit may pass through a lane without the same time adding or subtracting a digit from the counting mechanism. As soon as the signal strength returns to normal or when the system is restored to normal operation the phase indicator again provides accurate information concerning the location of the mobile craft but the integrating counters have, in the meantime, failed to record the lane change and as a result the actual position of the receiver cannot be determined. It would, of course, be desirable to provide a system which operates to provide lane identification signals to permit determination of the proper lane count so that the counters can be reset to the proper positions.

Systems of the type described in the Hawkins Patent No. 2,513,317 are presently in use in the United States and elsewhere to provide position information. It would be desirable to provide these existing systems with apparatus necessary to develop indications for resolving the ambiguities described above while at the same time utilizing a minimum amount of additional equipment both at the transmitting stations and at the mobile receiving units. The satisfaction of this desire, therefore, is an important object of the present invention.

It is also desirable to supplement the existing facilities to provide lane identification signals while at the same time maintaining a compatible system, that is, to permit normal operation of the old type mobile receiving units not equipped to use the lane identification signals without degradation of the quality of the position information. The provision of lane identification facilities to satisfy the latter desire, therefore, constitutes another important object of the present invention.

A further object of the invention is to provide new and improved apparatus for providing lane identification information to facilitate retrieving lost lanes in a hyperbolic continuous wave radio position finding system. The provision of lane identification facilities to satisfy the latter desire, therefore, constitutes another important object of the present invention.

A further object of the invention is to provide new and improved apparatus for providing lane identification information to facilitate retrieving lost lanes in a hyperbolic, continuous wave, radio position finding system.

Another object of the present invention is to provide a new and improved transmitting system for use in radio position finding systems of the character described above.

The invention has for another object the provision of a new and improved arrangement for sequentially operating the various transmitters at the different stations to economize upon the number of transmitting sites used, the equipment necessary at each site, and the number of frequency channels required.

The invention has for a further object the provision of an improved radio location system of the continuous wave type which is free of phase synchronization difficulties of the character mentioned and in which the aforementioned disadvantages with respect to ambiguity resolution are obviated.

Still another object of the present invention is to provide an improved radio location system of the continuous wave type in which the ambiguity resolution is achieved by obtaining both coarse and medium positions indications having sensitivities different from the phase sensitivity normally determined by the frequencies of the radiated waves.

A still further object of the present invention is to provide a radio position finding system of the type described employing new and improved apparatus for providing unambiguous position indications.

Yet another object of the invention is to provide facilities for furnishing lane identification information by obtaining a plurality of low phase sensitivity position indications to provide a rough determination of the position of a mobile craft in order to resolve ambiguities in the position indications having higher phase sensitivities.

The invention has for still another object the provision of a radio position finding system of the character described wherein high phase sensitivity, medium phase sensitivity and low phase sensitivity position indications are obtained, the high phase sensitivity indications being characterized by closely spaced phase coincidences, the medium sensitivity indications being characterized by somewhat more widely spaced phase coincidences in order to resolve ambiguities in the high phase sensitivity position indications and the low phase sensitivity position indications being characterized by widely spaced phase coincidences to resolve ambiguities in the medium phase sensitivity position indications.

The invention, both as to its organization and manner of operation, together with further objects and advantages will best be understood by reference to the following detailed description taken in conjunction with the accompanying drawings, wherein:

FIG. 1 is a schematic diagram showing a typical arrangement of the transmitters employed in a three foci radio position finding system together with a mobile receiving unit whose position is to be determined.

FIG. 2 is a diagrammatic representation of the three transmitters of the system shown in FIG. 1 together with a mobile receiving unit which may be used with these transmitters to form a complete radio position finding system; and FIG. 3 is a chart or timing diagram showing the sequence of operation of the various transmitters in the system shown in FIGS. 1 and 2.

Referring now to the drawings and first to FIG. 1, the invention is there illustrated as a three foci hyperbolic, continuous wave system for providing position information at any number of mobile receiving units 10 which may be carried on vessels or vehicles operating within the mitters or transmitting units 11, 12 and 13. The transmitters 11, 12 and 13 are preferably spaced apart approximately equal distances and are so positioned that an imaginary base line 11a joining the points of location of the units 11 and 12 is angularly related to a similar base line 13a joining the points of location of the units 12 and 13. As a consequence, the transmitter or transmitting unit 12 may be considered to be the center transmitter, while the transmitting units 11 and 13 may be referred to as the end transmitters or stations and the latter units, for convenience, may be respectively designated as the Green end station and the Red end station.

The equipment provided at the center transmitting station 12 is effective to radiate a first ambiguity resolution signal which is periodically interrupted for a predetermined period to permit the alternate radiation of first and second fine position indicating signals. Each of the end transmitting stations is effective to radiate alternately a position indicating signal and an ambiguity resolution signal with the former signal being periodically modulated with low frequency reference signals derived from heterodyning signals received from the center station and from the other end station. Thus, each end station periodically acts as a reference or link station in the manner described in the Honore patent identified above. The three position indicating signals radiated from the stations 11, 12 and 13 fall within a first frequency channel while the first ambiguity resolution signal radiated from the center station and the ambiguity resolution signal radiated from the Green end station fall within a second frequency channel and the second ambiguity resolution signal radiated from the center station and the ambiguity resolution signal radiated from the Red end station fall within a third frequency channel.

The mobile receiving unit 10 receives all of the position indicating and ambiguity resolution signals as well as the reference signals modulated upon the position indicating signals radiated from the two end stations. The mobile receiving unit responds to the received signals by providing a first fine position indication representing the location of the mobile craft relative to a first or Green family of hyperbolic isophase lines having foci at the transmitting stations 11 and 12 and by providing a second fine position indication representing the location of the mobile craft relative to a second or Red family of hyperbolic isophase lines having foci at the transmitting stations 12 and 13. The mobile receiver 10 may also be equipped to count the lanes of the two families of isophase lines of each fine system traversed by the mobile craft. During the period when the ambiguity resolution signals are being received the mobile receiver is effective to provide other position indications for resolving the ambiguity of the two fine position indications referred to above.

In order to facilitate the description, particular frequencies have been assigned to the various transmitters and receivers of the transmitting and receiving units of the system but it should be understood that the assigned frequencies are merely exemplary and that other frequencies may be chosen, if desired. Briefly considered, the equipment provided at the center transmitting station 12 comprises three different oscillators or exciters 15, 16 and 17 for developing signals having different frequencies. Thus, as is indicated in FIG. 2 the oscillator or exciter 15 develops a first fine position indicating signal of high stability having a frequency of 1798.000 kilocycles while the oscillator or exciter 16 develops a second, highly stable, fine position indicating signal having a frequency of 1772.000 kilocycles and the oscillator or exciter 17 develops an ambiguity resolution signal having a frequency of 1648.000 kilocycles. The output of the exciters 15, 16 and 17 are respectively applied to gate circuits 18, 19 and 20 which are operated in sequence to apply the outputs of the three exciters in succession to an RF amplifier 14 for radiation from a transmitting antenna 21.

Each of the gate circuits may be of any conventional type, for example, multivibrator controlled electronic switches or motor driven commutating switches operated at any desired rate. The switching rate should not be very high, however, in order to avoid the creation of frequent switching transient periods during which it is extremely difficult to obtain accurate position indications.

Preferably, the gate circuits are so operated that the gate 20 is open for approximately one-half of each cycle of operation while the gate 18 is open for one-quarter of each cycle and the gate 19 is open for the next quarter of the cycle. A suitable switching rate is obtained if the total cycle is approximately one second in duration and, to facilitate the description, it will be assumed that the cycle begins with the opening of the gate 18 to apply the output of the exciter or oscillator 15 to the RF amplifier 14 during the first one-quarter second of each cycle whereupon the gate 18 closes and the gate 19 then opens in order to apply the output of the oscillator 16 to the RF amplifier during the second quarter cycle. At the end of the first half second the gate 19 closes and the gate 20 opens to apply the output of the oscillator 17 to the RF amplifier 14 for a full half second interval. Thus, the three signals developed by the oscillators 15, 16 and 17 are radiated from the antenna 21 in sequence during different intervals of each cycle.

The equipment provided at the Green end station 11 comprises a first oscillator or exciter 22 for developing signals having a frequency of 1798.260 kilocycles and a second oscillator of exciter developing an ambiguity resolution signal having a frequency of 1648.095 kilocycles. The outputs of the oscillators 22 and 23 are respectively applied to a pair of gate circuits 24 and 25 which alternately supply the two signals developed by the two oscillators to an RF amplifier 26 having its output connected to a radiating or emitting antenna 27. For the purpose of developing reference signals for modulation upon the wave developed by the oscillator 22 and also for developing control signals to control the operation of the gate 24 and 25, the Green end station 11 further comprises a receiving or detecting antenna 28 for supplying input signals to a pair of radio frequency receivers 29 and 30. The latter receivers are of the superheterodyne type and are of conventional construction. The receiver 29 is tuned to a frequency near 1648 kilocycles in order to accept the signal developed by the oscillator 17 at the center station and also to accept the ambiguity resolution signal radiated from the Red end station 13 in a manner described more fully hereinafter. The receiver 29 is sufficiently selective to reject the signals developed by the oscillators 15 and 16 at the center station as well as the two position indicating signals respectively radiated from the end stations. The receiver 30 is tuned to a frequency near 1772 kilocycles and accepts both the signal developed by the oscillator 16 at the center station and the position indicating signal radiated from the Red end station 13. The receiver 30 is sufficiently selective to reject the two signals developed by the oscillators 15 and 17 at the center station and to reject all of the remaining signals radiated from the two end stations. A pair of band pass filters 31 and 34 are respectively connected to the outputs of the receivers 29 and 30 to pass only the desired signals developed by these two receivers. The band pass filter 31 is tuned to pass low frequency signals of 155 cycles while the band pass filter 34 is tuned to pass low frequency signals of 440 cycles. The outputs of the two filters 31 and 34 are applied to a mixer circuit 32 which supplies these signals to a conventional amplitude modulator circuit 33 without developing spurious signals. The modulator 33 is effective during certain periods of operation, as described more fully hereinafter, to amplitude modulate the carrier wave developed by the oscillators 22 with low frequency reference signals passed by the filter 34 and is effective during other periods to amplitude modulate the carrier wave developed by the oscillator 22 with low frequency reference signals passed by the filter 31. The output of the filter 34 is also passed to a detector circuit 35 for detecting the presence of the 440 cycle signal and for developing a spike or pulse to trigger a gate control circuit 36. The latter circuit, in turn, controls the gate circuits 24 and 25 to render them alternately effective to pass signals to the RF amplifier 26.

The equipment provided at the Red end station 13 is generally similar to that provided at the Green end station and includes a first oscillator or exciter 37 for developing a position indicating signal having a frequency of 1772.440 kilocycles and a second exciter or oscillator 38 for developing an ambiguity resolution signal having a frequency of 1647.845 kilocycles. The outputs of the two oscillators 37 and 38 are respectively applied to gate circuits 39 and 40 which function to supply these signals alternately to an RF amplifier 41 having its output circuit connected to a radiating or emitting antenna 42. For the purpose of developing reference signals for modulation on the carrier waves developed by the oscillators 37 and 38 and also for providing a control signal for controlling the operation of the gates 39 and 40, the Red end station 13 further comprises a detecting or receiving antenna 43 supplying drive signals for a pair of conventional superheterodyne receivers 44 and 45. The receiver 44 is tuned to a frequency near 1648 kilocycles and accepts the signal developed by the oscillator 17 at the center station 12 and the signal developed by the oscillator 23 at the Green end station 11. The receiver 44 rejects the signals developed by the oscillators 15 and 16 at the center station and the signals developed by the oscillators 22 and 37 at the two end stations. The receiver 45 is center tuned to a frequency near 1798 kilocycles and accepts the signals developed by the oscillator 15 at the center station and the signals developed by the oscillator 22 at the Green end station. The receiver 45 is sufficiently selective to reject the signals developed by the oscillators 16 and 17 at the center station and to reject the signals developed by the oscillators 23, 37 and 38 at the two end stations. The outputs of the receivers 44 and 45 are respectively applied to a pair of band pass filters 46 and 49. The band pass filter 46 is tuned to pass 95 cycle signals while the band pass filter 49 is tuned to pass 260 cycle signals. The signals passed by the filters 46 and 49 are applied to a mixer circuit 47 which, in turn, supplies them to a conventional amplitude modulator circuit 48. The modulator circuit functions to amplitude modulate the carrier wave developed by the oscillator 37 with low frequency reference signals passed by the filter 49 during certain periods of operation and during other periods, it serves to amplitude modulate the carrier wave developed by the oscillator 37 with low frequency reference signals passed by the filter 46. The output of the filter 46 is also applied to a detector 50 which detects the presence of the 95 cycle signal and develops a pulse for triggering a gate control circuit 51. The latter circuit renders the gates 39 and 40 alternately effective to pass the signals from the oscillators 37 and 38.

Considering next the operation of the transmitting stations 11, 12 and 13, during the first one-quarter second of each cycle the center station 12 is effective to radiate a position indicating signal having a frequency of 1798 kilocycles as is indicated by the block 15a on the timing chart or network keying diagram shown in FIG. 3. During this same one-quarter second period, the Green end station is effective to radiate a position indicating signal having a frequency of 1798.260 kilocycles as represented by the block 22a in FIG. 3. Thus, during this first one-quarter second period the gate circuit 24 at the Green end station is open to apply the output of the oscillator 22 to the RF amplifier 26 while the gate circuit 25 is closed to prevent the application of signals from the oscillator 23 to the RF amplifier. At the Red end station the two signals respectively developed by the oscillators 15 and 22 arrive at the receiving antenna 43 and are passed through the RF section of the receiver 45 which functions to heterodyne them to develop the 260 cycle beat or difference frequency therebetween. This signal is passed through the filter 49 and through the mixer 47 to the amplitude modulator 48 where it is amplitude modulated upon the carrier wave developed by the oscillator 37 and passed through the gate circuit 39. Thus, during this first one-quarter second interval, the gate 39 is open but the gate 40 is closed and, as a consequence, the 1772.440 kilocycle signal radiated from the antenna 42 is amplitude modulated with the 260 cycle reference signal developed by the receiver 45 as is indicated by the block 37b in FIG. 3.

At the end of the first one-quarter second interval the gate circuit 18 closes and the gate circuit 19 opens so that the center station is effective to radiate a second position indicating signal of 1772 kilocycles as represented by the block 16a in FIG. 3. As soon at the radiation of 1798 kilocycles from the center station is terminated by closing of the gate 18 the receiver 45 at the Red end station no longer develops its 260 beat signal and, as a result, the carrier wave developed by the oscillator 37 is no longer modulated with reference signals. The gate 39 remains open, however, so that the Red end station radiates a pure or unmodulated signal having a frequency of 1772.440 kilocycles as represented by the block 37a in FIG. 3. The latter signal arrives at the antenna 28 simultaneously with the 1772.000 kilocycle signal radiated from the center station and both signals are passed to the RF section of the receiver 30 which functions to develop the 440 cycle beat or difference therebetween. This 440 cycle beat signal is passed through the filter 34 and through the mixer 32 to the amplitude modulator 33 where it is amplitude modulated upon the carrier wave developed by the oscillator 22. Thus during this one-quarter second the gate 24 remains open and the Green end station is effective to radiate a 1798.260 kilocycle carrier wave modulated with a 440 cycle reference signal as is indicated by the block 22b shown in FIG. 3. The 440 cycle signal is also passed to the detector circuit 35 which detects the presence of the 440 cycle signal. For example, this detector circuit 35 may comprise a triggered multivibrator which is pulsed when the 440 cycle signal is received to develop a square wave output having a duration existing as long as the 440 cycle signal persists at the output of the filter 34. The square wave terminates as soon as the 440 cycle signal disappears and a pulsing circuit is triggered by the trailing edge of the square wave to develop a sharp spike or pulse for exciting the gate control circuit 36. The gate control circuit may also comprise a multivibrator circuit for developing a gate signal in response to the pulse from the detector 35 which gate signal has a duration of approximately one-quarter second and is applied to the gate 25 to open the latter for a one-quarter second interval during which time the output of the oscillator 23 is applied to the RF amplifier 26. Throughout the remaining three quarter seconds of each cycle the gate control circuit 36 supplies a gate open signal to the gate 25 so that the gates 24 and 25 are opened alternately but remain open for different periods. Thus, when the gate 25 is opened at the end of the second quarter second of each cycle, the gate control circuit 36 is effective to close the gate 24 to interrupt the supply of signals from the oscillator 22 to the RF amplifier 26. More specifically, at the end of the first one-half second of the cycle the gate circuit 19 at the center station opens to interrupt the application of output signals from the oscillator 16 to the RF amplifier 14 and almost immediately the gate circuit 20 opens to supply the latter amplifier with signals developed by the oscillator 17 so that the center station is effective to radiate a 1648.000 kilocycle signal for the one-half second interval during which the gate 20 remains open. The latter radiation is represented by the block 17a in FIG. 3. When the radiation of 1772.000 kilocycle signals from the center station is terminated, the receiver 30 no longer develops the 440 cycle beat signal and, as a result, the output from the filter 34 disappears so that the detector 35 creates its trigger pulse with the results described above. The Green end station is thus rendered effective for a one-quarter second period to radiate an ambiguity resolution signal having a frequency of 1648.095 kilocycles as is indicated by the block 23a in FIG. 3. While a small portion of this signal may arrive at the antenna 28 simultaneously with the 1648.000 kilocycle signal from the center station such arrival has no effect upon the operation of the Green end station because the 95 cycle signal developed by the receiver 29 as a result of heterodyning these two arriving RF signals is rejected by the filter 31. At the Red end station 13, however, the 1648.000 kilocycle signal radiated by the center station and the 1648.095 kilocycle signal radiated by the Green end station arrive at the receiving antenna 43 and are passed through the RF section of the receiver 44 which functions to heterodyne or beat them to develop the 95 cycle difference frequency. This 95 cycle signal is passed through the filter 46 and through the mixer 47 to the amplitude modulator 48 for amplitude modulation upon the carrier wave developed by the oscillator 37. Thus, during this third quarter second of the cycle the gate 39 remains open and the gate 40 remains closed and, as a consequence, the Red end station is effective to radiate a 1772.440 kilocycle signal amplitude modulated with the 95 cycle signal passed through the filter 46 as is indicated by the block 37c in FIG. 3. Since the gate signal developed by the gate control circuit 36 and applied to the gate 25 persists for only a one-quarter second period the latter gate will revert to its closed condition at the end of the third quarter second of the cycle and, at the same time, the gate 24 will revert to the open condition whereupon the radiation of 1648.095 kilocycle signals from the Green end station is terminated. The output from the oscillator 22 is again applied to the RF amplifier so that the Green end station radiates a 1798.260 kilocycle signal during the fourth quarter second of each cycle. As soon as the radiation of 1648.095 kilocycle signals from the Green end station terminates, the receiver 44 at the Red end station no longer develops a 95 cycle beat signal and, as a result, the detector 50 senses the absence of the 95 cycle signals at the output of the filter 46. In this connection the detector 50 is similar to the detector 35 described above but detects the presence of the 95 cycle signal. More specifically, the detector 50 may comprise a triggered multivibrator which is pulsed at the start of the 95 cycle signals passed by the filter 46 and is turned off only when such signals disappear. A sharp spike or pulse is developed by the trailing edge of the envelope or multivibrator output from the detector 50 and this sharp spike or pulse triggers the gate control circuit 51 to apply a gate open signal to the gate 40 for a one-quarter second period. The gate control circuit 51 may comprise a multivibrator which is triggered by the pulse from the detector 50 to develop the gate control signal for the gate 40. At the same time, the gate control circuit removes the "gate on" signal from the gate 39 so that the ouput from the oscillator 37 is no longer applied to the RF amplifier 41. However, with the gate 40 open, signals developed by the oscillator 38 are applied to the RF amplifier and, as a consequence, the Red end station radiates a pure or unmodulated signal of 1647.845 kilocycles during the fourth quarter second of each cycle as is indicated by the block 38a in FIG. 3. The latter signal arrives at the antenna 28 simultaneously with the 1648.000 kilocycle signal radiated from the center station and these two signals are applied through the RF section of the receiver 29 where they are heterodyned to produce the 155 cycle difference or beat signal. The latter signal is passed through the filter 31 and through the mixer 32 to the amplitude modulator 33 where it is amplitude modulated as a reference signal upon the 1798.260 kilocycle signal developed by the oscillator 22 and passed through the open gate circuit 24. Thus, during the fourth quarter second of each cycle the Green end station is effective to radiate a 1798.260 kilocycle carrier wave amplitude modulated with the 155 cycle reference signal as is indicated by the block 22c in FIG. 3.

At the end of the fourth quarter second of each cycle the gate 20 closes to terminate the radiation of 1648.000 kilocycle signals from the center station and almost immediately the gate 18 opens to start the radiation of 1798.000 kilocycle signals. When the 1648.000 kilocycle signals no longer appear at the receiver 44, the 155 cycle signal at its output disappears and the modulation of reference signals on the wave developed by the oscillator 22 ceases. At the Red end station the "gate on" signal applied to the gate 40 during the fourth quarter second terminates and the gate 39 receives a gate on signal to keep it open for the next three quarter seconds. One complete cycle of operation of the transmitting portion of the system has now been described. The operation continues in an obvious manner.

The signals radiated from the three transmitting stations are received at the mobile receiving unit 10 which utilizes these signals to provide a pair of fine position indications for identifying the location of the mobile craft carrying this receiver unit. More specifically, as shown in FIG. 2 of the drawings, the equipment provided at the mobile receiving unit 10 comprises a receiving antenna 52 connected to supply input signals for three superheterodyne receivers 53, 54 and 55. The receiver 53 is like the receiver 45 at the Red end station 13 and is tuned to accept the two signals respectively developed by the oscillators 15, 22 and 31 and to reject the signals developed by all of the other oscillators at the three transmitting stations. The receiver 54 is tuned to accept the two signals developed by the oscillators 19 and 37 but to reject all of the signals generated by the other oscillators. The receiver 55 is like the receivers 29 and 45 at the two end stations and receives the signals developed by the oscillators 17, 23 and 38.

During the first quarter second of the cycle the 1798.000 kilocycle signal radiated from the center station 12 and the 1798.260 kilocycle signal radiated from the end station 11 arrive at the receiving antenna 52 and are passed through the RF section of the receiver 53 where they are heterodyned to develop the 260 cycle difference or beat frequency. The output of the receiver 53 is connected to three band pass filters 57, 58 and 62 with the filter 57 being tuned to pass signals having a frequency of 260 cycles, the filter 58 being tuned to pass 440 cycle signals and the filter 62 being tuned to pass 155 cycle signals. Thus, the 260 cycle beat signal developed by the receiver 53 during the first one-quarter second of each cycle is passed through the filter 57 to an input circuit 63b of a phase discriminator, servo-amplifier and servo-motor circuit 63. The filters 58 and 62, of course, reject the 260 cycle signal developed by the receiver 53 during this period of operation. The 1772.440 kilocycle signal radiated by the Red end station during the first quarter second of each cycle also arrives at the antenna 52 and is passed to the receiver 54 which detects the 260 cycle modulation component or reference signal appearing thereon. The output of the receiver 54 is connected to the three band pass filters 59, 60 and 61 with the filter 59 being tuned to pass 260 cycle signals, the filter 60 being tuned to pass 440 cycle signals and the filter 61 being tuned to pass 95 cycle signals. The 260 cycle modulation component reproduced by the receiver 54 during the first one-quarter second interval is passed through the filter 59 to a second input 63a of the circuit 63 referred to above. The filters 60 and 61, of course, reject the 260 cycle reference signal. Thus, the phase discriminator, servo-amplifier and servo-motor circuit 63 is excited by a pair of identical frequency signals respectively applied to its input circuit 63a and 63b. The discriminator portion of the circuit 63 compares the phase of the two applied input signals and develops a D.C. output signal whenever these two signals are not in phase. The polarity of the D.C. signal is a function of the direction of the phase deviation while the magnitude of this signal is a function of the amount of the phase deviation. This D.C. control signal is passed through the servo-amplifier portion of the circuit 63 and is applied to the servo-motor to drive the latter in a direction which is determined by the polarity of the D.C. control signal and by an amount which is determined by the amplitude of this signal. The output of the servo-motor is represented by the broken line 64 in FIG. 2 and drives a pointer 65 of a phase meter or indicator 66 which pointer passes over a graduated scale or circular dial forming the face of the phase meter. The pointer is thus driven by the servo-motor to a position indicating the phase relationship between the two signals applied to the input circuits 63a and 63b. The output of the servo-motor is also connected to drive the rotor of a conventional synchro-transmitter 67 which has induced in its stator windings an electrical signal representing the rotor position.

The phase discriminator, servo-amplifier and servo-motor circuit 63 is generally similar to the arrangement described and claimed in United States Patent No. 2,551,211 granted to James E. Hawkins and Beverly W. Koeppel and assigned to the same assignee as the present invention. Reference to the latter patent may be taken for a more detailed description for the operation of the individual components of the indicating equipment at the mobile receiving unit 10. As will be understood by those skilled in this art and particularly from an understanding of Hawkins Patent No. 2,513,317 referred to above, the reading provided by the indicator 66 is a measure of the position of the mobile receiving unit 10 along one of the hyperbolic isophase lines of a Green family of such lines having foci at the stations 11 and 12 and effectively produced by the radiation of the position indicating signals developed by the oscillators 15 and 22 during the first quarter second of each cycle and by the radiation of the reference signal from the station 13 during this same period. The indicating scale on the face of the indicator 66 provides a continuous reading from zero degrees to three hundred sixty degrees and, hence, one complete revolution of the pointer 65 during movement of the mobile craft carrying the receiving unit 10 indicates that a lane of the Green hyperbolic family has been traversed. The lanes of the Green family to which the indications on the indicator 66 pertain are spaced apart along the base line 11a by a distance equal to one-half wavelength of the frequency of the 1798.000 kilocycle position indicating channel and, since these lanes diverge on both sides of the base line, a greater distance must be traversed in other areas to cause a complete revolution of the pointer 65. The latter pointer may be connected through mechanism not shown in the drawings to drive a set of integrating counters 68 which register the number of complete 360° revolutions of the pointer 65, thereby to identify the Green lane within which the mobile receiving unit 10 is located.

During the second quarter second of each cycle, the receiver 53 reproduces the 440 cycle reference signal appearing on the carrier wave radiated from the Green end station 11 while the receiver 54 heterodynes the two position indicating signals respectively developed by the oscillators 16 and 37 to produce a 440 cycle beat or difference signal. The 440 cycle reference signal reproduced by the receiver 53 is passed through the band pass filter 58 and is applied to a first input circuit 69b of a phase discriminator, amplifier and servo-motor circuit 69 where it is phase compared with the 440 cycle beat signal developed by the receiver 54 as a result of heterodyning the two position indicating signals of 1772.000 and 1772.440 kilocycles respectively received from the stations 12 and 13. The latter 440 cycle beat signal is passed through the filter 60 and is applied to a second input 69a of the circuit 69. The latter circuit is similar in construction to the phase discriminator, amplifier and servo-motor circuit 63 described above and, as a result, its phase discriminator portion is effective to produce a D.C. control signal whenever the two signals applied to the two input circuits 69a and 69b are not in phase. The latter D.C. signal is amplified and is then used to drive the servo-motor of the circuit 69 so that the output shaft, represented by the broken line 70, occupies a position determined by the phase relationship between the two signals respectively applied to the input circuits 69a and 69b. The servo-motor shaft 70 is connected to drive a pointer 71 of a phase indicator 72 which is identical in construction to the indicator 66 referred to above. As will be apparent from the foregoing description the pointer 71 cooperates with a circular graduated scale or dial to identify the position of the mobile craft along one of the hyperbolic isophase lines of a Red family having foci at the stations 12 and 13 in order to provide a fine or accurate indication representing the position of the mobile craft relative to these two stations. The pointer 71 may drive a set of integrating counters 73 for counting the number of complete revolutions of the pointer 71, thereby to identify the number of lanes of the Red family of hyperbolic lines traversed and, hence, to indicate the lane of the Red family within which the mobile craft is located.

In operation the mobile receiving unit 10 may enter the field of radiation of the transmitting units 11, 12, 13 and 14 at a known geographic location and, at this time, the indicators 66 and 72 and their associated counters 68 and 73 may be initially set until their readings correspond to this known geographic location. The pointers 65 and 71 of the indicators are then driven in response to the received signals as the mobile craft is moved from the known geographic location. The output shaft 70 of the servo-motor in the circuit 69 is also connected to drive a rotor of a conventional synchro-transmitter 74 which is like the synchro-transmitter 67 referred to above and which functions to produce at its output or stator windings an electrical signal representing the position of the pointer 71 or, more specifically, the phase relationship between the two signals applied to the input circuits 69a and 69b.

As thus far described, the indicating equipment is similar to that disclosed in the above-identified Hawkins Patent No. 2,513,317 and, hence, as long as the system remains in continuous operation following the start of the mobile receiving unit at the known geographic location, the pointers 65 and 71 and the counters 68 and 73 function continuously to provide position information identifying a set of intersecting hyperbolic lines forming a position fix at the location of the mobile craft. In the event of equipment failure, either at the transmitting stations or the receiving equipment at the mobile unit, the signal drive to either or both of the phase comparison circuits 63 or 69 may be interrupted and, as a consequence, the pointers and the integrating counters of the non-excited circuit or cirucits will remain in the positions occupied just prior to the interruption. Thus, considering the operation of the Green comparison circuit 63 it will be observed that the indications of the pointer 65 and the counter 78 will be maintained despite movement of the mobile craft within the radiation field of the transmitters 11 and 12 during the interuption period and, hence, when the source of trouble has been located and repaired and when the system is restored to normal operation, the indications provided by the Green indicating system will no longer be accurate. More specifically, when the system operation is restored, the 260 cycle reference signal passed by the filter 59 and the 260 cycle heterodyne signal passed by the filter 57 will immediately excite the phase discriminator, amplifier and servo-motor circuit 63 to drive the output shaft 64 until the servo loop in the circuit 63 is balanced whereupon the pointer 65 provides an accurate indication of the hyperbolic isophase line of the Green family along which the mobile receiver unit is located. However, if the mobile receiving unit has traversed one or more full lanes of the Green family during the period of interruption the revolution counter 68 has failed to register the lane change so that it no longer provides an accurate lane count. This same condition may exist in the Red indicating equipment including the circuit 69 and the indicator 72.

In accordance with the present invention, however, lane identification facilities generally indicated by the reference numeral 75 are employed to provide additional position indications to permit identification of the approximate position of the mobile receiving unit 10 so that ambiguities in the fine position indications may be resolved and also to permit the mobile craft to enter the radiation field at other than a known location. The additional equipment making up the lane identification facilities has been enclosed within a broken line box 75 in FIG. 2 and includes the receiver 55 and the two filters 61 and 62 referred to above. The equipment at the unit 10 other than that in the box 75 is present in existing units described in Patent No. 2,513,317 and, hence, any of these units may without alteration be used to provide a pair of fine position indications although obviously they will not provide other indications for resolving ambiguities in the fine systems other than through the indications on the counters 68 and 73. In accordance with the present invention such ambiguity resolution can be obtained by adding the lane identification facilities 75 which may be formed as a separate subcircuit for plugging into or wiring to the existing mobile receiving equipment. In the operation of these facilities, the output of the receiver 55 is connected to a pair of band pass filters 76 and 77 which are respectively tuned to pass 95 and 155 cycle signals.

During the third quarter second of each cycle when the stations 11 and 12 are simultaneously effective to radiate the signals developed by the exciters 17 and 23 the carrier wave radiated from the station 13 will be modulated by a 95 cycle reference signal developed by the receiver 44 and passed through the filter 46. This 95 cycle reference signal is detected by the receiver 54 at the mobile unit and is passed through the filter 61. At the same time, the receiver 55 is effective to heterodyne the two signals developed by the oscillators 17 and 23 when these two signals arrive simultaneously at the antenna 52 so that the receiver 55 is effective to develop a 95 cycle beat or difference frequency signal which is passed through the filter 76 but is, of course, rejected by the filter 77. During the fourth quarter second of each cycle when the stations 12 and 13 are effective to radiate simultaneously the two signals respectively developed by the oscillators 17 and 38 the Green end station 11 is effective to modulate the carrier wave developed by the oscillator 22 with a 155 cycle beat frequency signal developed by the receiver 29 and passed through the filter 31. During these portions of the cycle, the receiver 53 at the mobile receiving unit 10 is effective to reproduce the 155 cycle reference signal which is passed through the filter 62. During these same portions of the cycle the ambiguity resolution signals respectively developed by the oscillators 17 and 38 and radiated from the stations 12 and 13 will arrive at the antenna 52 and will be heterodyned by the receiver 55 to develop the 155 cycle beat or difference frequency therebetween. The latter beat signal is passed through the filter 77 but is, of course, rejected by the filter 76.

The signals passed by the filters 61, 62, 76 and 77 and the two signals developed by the stator windings of the synchro transmitters 67 and 74 are passed through a base selector switch 78 to a coarse or ambiguity resolution indicating esystem identified generally by the reference numeral 79. The switch 78 has four switch sections 80, 81, 82 and 83 having movable poles or arms ganged together for joint operation. With the base line selector switch 78 in the "Red" position shown in FIG. 2, the indicating equipment 79 is effective to provide an ambiguity resolution position indication representative of the location of the mobile craft relative to hyperbolic isophase lines having foci at the stations 12 and 13 in order to provide an approximate position indication for identifying the particular isophase line of the fine Red family along which the mobile craft is located. The position indication provided by the equipment 79 will be a low phase sensitivity or coarse indication since it will relate to hyperbolic isophase lines having a spacing approximately fourteen times greater than the spacing between the hyperbolic isophase lines of the fine Red family. These coarse position indications are effective to identify the particular lane of the fine "Red" system within which the mobile craft is located.

When the four sections of the base line selector switch 78 are thrown to the "Green" position, the indicating equipment 79 is effective to provide coarse position indications relative to hyperbolic isophase lines having foci at the stations 11 and 12. More specifically, the indicating equipment 79 provides a low phase sensitivity or coarse position indication to identify the location of the mobile craft relative to hyperbolic isophase lines having foci at the stations 11 and 12 and characterized by phase coincidences approximately 12 times wider than the phase coincidences of the fine Green family of hyperbolic isophase lines. Here again, the coarse position indications are effective to identify the particular lane of the fine Green system within which the mobile receiver 10 is located.

To accomplish these results, the indicating equipment 79 comprises a phase discriminator and servo-amplifier circuit 84 and a servo-motor 85 which, taken together, are similar to each of the circuits 69 and 63 described above. The phase discriminator and servo-amplifier 84 has a first signal input circuit 84a which receives input signals from section 80 of the base line selector switch 78 and a second input circuit 84b which receives input signals from section 82 of the base selector switch 78. The phase discriminator portion of the circuit 84 compares the phases of the two signals applied to the input circuits 84a and 84b and provides a D.C. control signal whenever these two applied signals are out of phase. This D.C. control signal is passed through the servo-amplifier portion of the circuit 84 and drives the servomotor 85 which has its output shaft, as indicated by the broken lines 85a, connected to drive a pointer 86 of a phase indicator or meter 87 to provide an indication of the phase relationship between the two signals applied to the input terminals of the circuit 84 in a manner which will be obvious in view of the foregoing description. The output shaft of the motor 85 is also connected to drive the casing of a control transformer or resolver 88 of the type described in the above-identified Patent No. 2,551,211. This resolver includes a rotor winding and a pair of stator windings which are displaced mechanically 90° apart and are excited with excitation signals displaced by 90° in phase. The rotor of the resolver 88 is connected, as indicated by the broken line 89, to the rotor of a synchro receiver 90 which has its stator winding 90a supplied with signals from section 81 of the base line selector switch 78. The rotor windings of the resolver or control transformer 88 are excited with signals derived from section 83 of the base line selector switch. The stator windings of the control transformer or resolver 88 are connected to a pair of phase networks 91 and 92. The network 91 passes audio frequency signals of 95 cycles while the filter 92 passes low frequency signals of 155 cycles. The outputs from the phase networks 91 and 92 are respectively applied to the two fixed contacts of section 80 of the base line selector switch 78.

Assuming first that the switch 78 is in the "Red" position shown in FIG. 2, it is apparent that the 95 cycle reference signal reproduced by the receiver 54 and the 95 beat signal developed by the receiver 55 have no effect upon the operation of the coarse position indicating facilities 75. However, the 155 cycle reference signal developed by the receiver 53 and passed through the filter 62 during the fourth quarter second of each cycle is applied through the switch section 82 to the input circuit 84b of the phase discriminator and servo-amplifier 84. During this same interval, the 155 cycle beat signal developed by the receiver 55 and passed through the filter 77 is applied through the switch section 83 to the rotor winding of the resolver or control transformer 88. The stator winding of the control transformer 88 thus has induced therein a 155 cycle signal which is passed through the phase network 92 and through the switch section 80 to the input circuit 84a of the phase discriminator and servo-amplifier 84. The circuit 84 thus has applied to its opposed inputs 84a and 84b a pair of 155 cycle signals which are effective to provide a drive signal for the motor 85 whenever they are not in phase. The pointer 86 is driven in the manner described above to indicate the phase relationship between these two applied 155 cycle signals. If it were not for the action of the control transformer or resolver 88 the indicator 87 would provide an indication of the position of the mobile craft relative to hyperbolic isophase lines having foci at the stations 12 and 13 and spaced apart along the base line 16 by one-half wavelength of the 1648 kilocycle ambiguity resolution channel. However, the rotor of the resolver 88 is driven by the synchro receiver 90 which receives its excitation signals from the synchro transmitter 74 after passage through the conductor 74a and through section 81 of the base selector switch. The rotor of the synchro receiver 90 is driven at a rate equal to the rate of rotation of the pointer 71 as the mobile craft is moved to traverse the hyperbolic isophase lines of the fine Red family. As will be understood by those skilled in this art, were it not for the action of the servo motor 85, the phase of the signal output from the resolver 88 would change at a rate determined not by the frequency of the signals of the 1648 kilocycle ambiguity resolution channel alone, but at a rate determined by the difference between the fine position indicating signal channel of 1772 kilocycles and the 1648 kilocycle frequency of the signals of the ambiguity resolution signal channel or, more specifically, at a rate corresponding to the difference of 124 kilocycles. Thus, the signal output of the resolver 88 would change in phase at a rate of about one-tenth the rate of change in phase of the fine position indicating signal passed through the filter 60. The servo motor 85, however, prevents the described change in phase of the signal and, as a result, drives the pointer 86 at a rate approximately one-fourteenth the rate of drive of the pointer 71 so that the pointer 86 makes one complete revolution as the pointer 71 makes approximately fourteen complete revolutions. The indicator 87 thus provides a low phase sensitivity or coarse position indication representing the position of the mobile craft 10 relative to hyperbolic isophase lines having foci at the units 12 and 13 and spaced apart along the base line 16 by a distance equal to about fourteen times as great as the spacing between adjacent isophase lines of the fine Red family. This position indication has a range of accuracy sufficient to determine the particular lane of the fine Red system. Thus, if the operator at the mobile unit 10 desires to determine his approximate position or if he desires to check the lane count on the counter 73 he merely transfers the reading of the indicator 87 to a chart or nomograph of the area being surveyed. He may then check this information to make certain that it agrees with the lane count on the counter 73. If the reading of the indicator 87 does not correspond with the indication on the counter 73, the latter counters may be reset.

If the operator at the mobile unit desires to obtain a second low phase sensitivity or coarse position indication or to check the lane count provided by the lane counter 68, he merely throws the base line selector switch 78 to the Green position whereupon the 155 cycle signal developed by the reference receiver 53 and the 155 cycle beat signal produced by the receiver 55 no longer have any effect upon the operation of the coarse position indicating facilities 75. The 95 cycle reference signal reproduced by the receiver 54 is passed through the filter 61 and through section 82 of the base selector switch to the input 84b of the phase discriminator and servo-amplifier circuit 84 while the 95 cycle beat signal developed by the receiver 55 is passed through the filter 76 and through the switch section 83 to the rotor winding of the control transformer or resolver 88. The switch section 81 supplies the output of the synchro transmitter 67 appearing upon conductor 67a to the synchro receiver 90 so that the rotor of the latter receiver is driven at a rate corresponding to the rate of rotation of the pointer 65. As will be understood from the foregoing description, except for the action of the servo motor 85, the 95 cycle signals induced in the rotor winding of the resolver 88 would change in phase at a rate determined by the frequency difference between the 1798 kilocycle signals of the fine position indicating signal channel and the 1648 kilocycle signals of the ambiguity resolution channel or, more specifically, at a rate determined by the phantom frequency of approximately 150 kilocycles. As will be understood from the foregoing discussion, the indication provided by the indicator 87, with the selector switch 78 in the Green position, is effective to identify the lane of the fine Green system when this indication is referred to the chart or nomograph of the survey area.

While a particular embodiment of the invention has been illustrated and described, it will be recognized that many modifications and changes will readily occur to those skilled in this art and it is, therefore, contemplated by the appended claims to cover any such modifications as fall within the true spirit and scope of the invention.

What is claimed as new and desired to be secured by Letters Patent of the United States is:

1. A radio position finding system of the hyperbolic, continuous wave type comprising first, second and third spaced apart transmitting stations and a mobile receiving unit the position of which is to be determined, first, second and third transmitters at said first station, means for rendering said first, second and third transmitters effective in sequence to respectively radiate first, second and third signals during different intervals, first transmitter being effective during a first interval, said second transmitter being effective during a second interval and said third transmitter being effective during third and fourth intervals, fourth and fifth transmitters at said second station for respectively radiating fourth and fifth signals, control means at said second station for rendering said fourth transmitter effective during said third interval and for rendering said fifth transmitter effective during said first, second and fourth intervals, sixth and seventh transmitters at said third station for respectively radiating sixth and seventh signals, control means at said third station for rendering said sixth transmitter effective during said fourth interval and for rendering said seventh transmitter effective during said first, second and third intervals, first receiving means at said second station for receiving and heterodyning the second and seventh signals to develop a first beat signal during said second interval, means for modulating said fifth signal with a first reference signal derived from said first beat signal, second receiving means at said second station for receiving and heterodyning said third and sixth signals during said fourth interval to develop a second beat signal, means for modulating said fifth signal with a second reference signal derived from said second beat signal, third receiving means at said third station for receiving and heterodyning said third and fifth signals during said first interval to develop a third beat signal, means for modulating said seventh signal with a third reference signal derived from said third beat signal, fourth receiving means at said third station for receiving and heterodyning said third and fourth signals during said third interval to develop a fourth beat signal, means for modulating said seventh signal with a fourth reference signal derived from said fourth beat signal, fifth receiving means at said mobile unit for receiving and heterodyning said first and fifth signals during said first interval to develop a fifth beat signal and for reproducing said first and second reference signals during said second and fourth intervals, sixth receiving means at said mobile unit for receiving and heterodyning said second and seventh signals during said second interval to develop a sixth beat signal and for reproducing said third and fourth reference signals during said first and third intervals, seventh receiving means at said mobile unit for receiving and heterodyning said third, fourth and sixth signals in pairs to develop a seventh beat signal as a result of heterodyning said third and fourth signals during said third interval and to develop an eighth beat signal as a result of heterodyning said third and sixth signals during said fourth interval, first indicating means jointly responsive to said fifth beat signal and said third reference signal for providing a first fine position indication representing the location of said mobile receiving unit relative to said first and second stations, second indicating means jointly responsive to said sixth beat signal and said first reference signal for providing a second fine position indication representing the location of the mobile unit relative to said first and third stations, third indicating means jointly responsive to said fifth and seventh beat signals and to said third and fourth reference signals for providing a first coarse position indication representing the location of the mobile receiving unit relative to said first and second stations, and fourth indicating means jointly responsive to said sixth and eighth beat signals and to said first and second reference signals for providing a second coarse position indication representing the location of the mobile receiving unit relative to said first and third stations.

2. The apparatus defined by claim 1 wherein the control means at said second station comprises means responsive to said second beat signal for developing a first control signal, and means responsive to said first control signal for rendering said fourth and fifth transmitters alternately effective, and wherein the control means at said third station comprises means responsive to said fourth beat signal for developing a second control signal, and means responsive to said second control signal for rendering said sixth and seventh transmitters alternately effective.

3. The apparatus defined by claim 2 wherein the means for developing the first control signal comprises a detector for detecting the presence of said second beat signal and for producing a first trigger signal when said second beat signal disappears, the means responsive to said first control signal including a circuit excited by said first trigger signal to effect the alternate operation of said fourth and fifth transmitters, the means for developing the second control signal comprising a detector for detecting the presence of said fourth beat signal and for producing a second trigger signal when said fourth beat signal disappears, the means responsive to said second control signal including a circuit excited by said second trigger signal to effect the alternate operation of said sixth and seventh transmitters.

4. The apparatus defined by claim 1 wherein said first, second, third and fourth intervals are substantially equal in duration.

5. The apparatus defined by claim 1 wherein said third and fourth indicating means comprise a single indicating circuit, and switch means for selectively rendering said circuit effective to provide either said first coarse indication or said second coarse indication.

6. A radio position finding system of the hyperbolic, continuous wave type comprising first, second and third spaced apart transmitting stations and a mobile receiving unit the position of which is to be determined, first, second and third transmitters at said first station, means for rendering said first, second and third transmitters effective in sequence to respectively radiate first, second and third signals during different intervals, said first transmitter being effective during a first interval, said second transmitter being effective during a second interval and said third transmitter being effective during third and fourth intervals, fourth and fifth transmitters at said second station for respectively radiating fourth and fifth signals, control means at said second station for rendering said fourth transmitter effective during said third interval and for rendering said fifth transmiter effective during said first, second and fourth intervals, sixth and seventh transmitters at said third station for respectively radiating sixth and seventh signals, control means at said third station for rendering said sixth transmitter effective during said fourth interval and for rendering said seventh transmitter effective during said first, second and third intervals, first receiving means in said system for receiving and heterodyning the second and seventh signals to develop a first beat signal during said second interval and for radiating a first reference signal deriving from said first beat signal, second receiving means in said system for receiving and heterodyning said third and sixth signals during said fourth interval to develop a second beat signal and for radiating a second reference signal derived from said second beat signal, third receiving means in said system for receiving and heterodyning said first and fifth signals during said first interval to develop a third beat signal and for radiating a third reference signal derived from said third beat signal, fourth receiving means in said system for receiving and heterodyning said third and fourth signals during said third interval to develop a fourth beat signal and for radiating a fourth reference signal derived from said fourth beat signal, receiving means at said mobile unit for receiving and heterodyning said first and fifth signals during said first interval to develop a fifth beat signal, for heterodyning said second and seventh signals during said second interval to develop a sixth beat signal, for heterodyning said third and fourth signals during said third interval to develop a seventh beat signal, for heterodyning said third and sixth signals during said fourth interval to develop an eighth beat signal and for reproducing all four of said reference signals, first indicating means jointly responsive to said fifth beat signal and said third reference signal for providing a first fine position indication representing the location of said mobile receiving unit relative to said first and second stations, second indicating means jointly responsive to said sixth beat signal and said first reference signal for providing a second fine position indication representing the location of the mobile unit relative to said first and third stations, third indicating means jointly responsive to said fifth and seventh beat signals and to said third and fourth reference signals for providing a first coarse position indication representing the location of the mobile receiving unit relative to said first and second stations, and fourth indicating means jointly responsive to said sixth and eighth beat signals and to said first and second reference signals for providing a second coarse position indication representing the location of the mobile receiving unit relative to said first and third stations.

7. The apparatus defined by claim 6 wherein the control means at said second station comprises means responsive to said second beat signal for developing a first control signal, and means responsive to said first control signal for rendering said fourth and fifth transmitters alternately effective, and wherein the control means at said third station comprises means responsive to said fourth beat signal for developing a second control signal, and means responsive to said second control signal for rendering said sixth and seventh transmitters alternately effective.

8. The apparatus defined by claim 7 wherein the means for developing the first control signal comprises a detector for detecting the presence of said second beat signal and for producing a first trigger signal when said second beat signal disappears, the means responsive to said first control signal including a circuit excited by said first trigger signal to effect the alternate operation of said fourth and fifth transmitters, the means for developing the second control signal comprising a detector for detecting the presence of said fourth beat signal and for producing a second trigger signal when said fourth beat signal disappears, the means responsive to said second control signal including a circuit excited by said second trigger signal to effect the alternate operation of said sixth and seventh transmitters.

9. The apparatus defined by claim 6 wherein said first, second, third and fourth intervals are substantially equal in duration.

10. The apparatus defined by claim 6 wherein said third and fourth indicating means comprise a single indicating circuit, and switch means for selectively rendering said circuit effective to provide either said first coarse indication or said second coarse indication.

11. A transmitting system of the hyperbolic, continuous wave type comprising first, second and third spaced apart transmitting stations, first, second and third transmitters at said first station, means for rendering said first, second and third transmitters effective in sequence to respectively radiate first, second and third signals during different intervals, said first transmitter being effective during a first interval, said second transmitter being effective during a second interval and said third transmitter being effective during third and fourth intervals, fourth and fifth transmitters at said second station for respectively radiating fourth and fifth signals, control means at said second station for rendering said fourth transmitter effective during said third interval and for rendering said fifth transmitter effective during said first, second and fourth intervals, sixth and seventh transmitters at said third station for respectively radiating sixth and seventh signals, control means at said third station for rendering said sixth transmitter effective during said fourth interval and for rendering said seventh transmitter effective during said first, second and third intervals, first receiving means at said second station for receiving and heterodyning the second and seventh signals to develop a first beat signal during said second interval, means for modulating said fifth signal with a first reference signal derived from said first beat signal, second receiving means at said second station for receiving and heterodyning said third and sixth signals during said fourth interval to develop a second beat signal, means for modulating said fifth signal with a second reference signal derived from said second beat signal, third receiving means at said third station for receiving and heterodyning said first and fifth signals during said first interval to develop a third beat signal, means for modulating said seventh signal with a third reference signal derived from said third beat signal, fourth receiving means at said third station for receiving and heterodyning said third and fourth signals during said third interval to develop a fourth beat signal, and means for modulating said seventh signal with a fourth reference signal derived from said fourth beat signal.

12. The apparatus defined by claim 11 wherein the control means at said second station comprises means responsive to said second beat signal for developing a first control signal, and means responsive to said first control signal for rendering said fourth and fifth transmitters alternately effective, and wherein the control means at said third station comprises means responsive to said fourth beat signal for developing a second control signal, and means responsive to said second control signal for rendering said sixth and seventh transmitters alternately effective.

13. The apparatus defined by claim 12 wherein the means for developing the first control signal comprises a detector for detecting the presence of said second beat signal and for producing a first trigger signal when said second beat signal disappears, the means responsive to said first control signal including a circuit excited by said first trigger signal to effect the alternate operation of said fourth and fifth transmitters, the means for developing the second control signal comprising a detector for detecting the presence of said fourth beat signal and for producing a second trigger signal when said fourth beat signal disappears, the means responsive to said second control signal including a circuit excited by said second trigger signal to effect the alternate operation of said sixth and seventh transmitters.

14. The apparatus defined by claim 11 wherein said first, second, third and fourth intervals are substantially equal in duration.

15. A transmitting system of the hyperbolic, continuous wave type comprising first, second and third spaced apart transmitting stations, first, second and third transmitters at said first station, means for rendering said first, second and third transmitters effective in sequence to respectively radiate first, second and third signals during different intervals, said first transmitter being effective during a first interval, said second transmitter being effective during a second interval and said third transmitter being effective during third and fourth intervals, fourth and fifth transmitters at said second station for respectively radiating fourth and fifth signals, control means at said second station for rendering said fourth transmitter effective during said third interval and for rendering said fifth transmitter effective during said first, second and fourth intervals, sixth and seventh transmitters at said third station for respectively radiating sixth and seventh signals, control means at said third station for rendering said sixth transmitter effective during said fourth interval and for rendering said seventh transmitter effective during said first, second and third intervals, first receiving means in said system for receiving and heterodyning the second and seventh signals to develop a first beat signal during said second interval and for radiating a first reference signal derived from said first beat signal, second receiving means in said system for receiving and heterodyning said third and sixth signals during said fourth interval to develop a second beat signal and for radiating a second reference signal derived from said second beat signal, third receiving means in said system for receiving and heterodyning said first and fifth signals during said first interval to develop a third beat signal and for radiating a third reference signal derived from said third beat signal, and fourth receiving means in said system for receiving and heterodyning said third and fourth signals during said third interval to develop a fourth beat signal, and for radiating a fourth reference signal derived from said fourth beat signal.

16. The apparatus defined by claim 15 wherein the control means at said second station comprises means responsive to said second beat signal for developing a first control signal, and means responsive to said first control signal for rendering said fourth and fifth transmitters alternately effective, and wherein the control means at said third station comprises means responsive to said fourth beat signal for developing a second control signal, and means responsive to said second control signal for rendering said sixth and seventh transmitters alternately effective.

17. The apparatus defined by claim 16 wherein the means for developing the first control signal comprises a detector for detecting the presence of said second beat signal and for producing a first trigger signal when said second beat signal disappears, the means responsive to said first control signal including a circuit excited by said first trigger signal to effect the alternate operation of said fourth and fifth transmitters, the means for developing the second control signal comprising a detector for detecting the presence of said fourth beat signal and for producing a second trigger signal when said fourth beat signal disappears, the means responsive to said second control signal including a circuit excited by said second trigger signal to effect the alternate operation of said sixth and seventh transmitters.

18. The apparatus defined by claim 15 wherein said first, second, third and fourth intervals are substantially equal in duration.

19. A transmitting system of the hyperbolic, continuous wave type comprising first, second and third spaced apart transmitting stations, first, second and third transmitters at said first station, means for rendering said first, second and third transmitters effective in sequence to respectively radiate first, second and third signals during different intervals, said first transmitter being effective during a first interval, said second transmitter being effective during a second interval and said third transmitter being effective during third and fourth intervals, fourth and fifth transmitters at said second station for respectively radiating fourth and fifth signals, control means at said second station for rendering said fourth transmitter effective during said third interval and for rendering said fifth transmitter effective during said first, second and fourth intervals, sixth and seventh transmitters at said third station for respectively radiating sixth and seventh signals, and control means at said third station for rendering said sixth transmitter effective during said fourth interval and for rendering said seventh transmitter effective during said first, second and third intervals.

20. The apparatus defined by claim 19 wherein the control means at said second station comprises means for receiving and heterodyning in pairs the signals from the first and third stations to develop beat signals, means responsive to at least a first of said beat signals for developing a first control signal, and means responsive to said first control signal for rendering said fourth and fifth transmitters alternately effective, and wherein the control means at said third station comprises means for receiving and heterodyning in pairs the signals from the first and second stations to develop additional beat signals, means responsive to at least one of the last mentioned beat signals for developing a second control signal, and means responsive to said second control signal for rendering said sixth and seventh transmitters alternately effective.

21. The apparatus defined by claim 20 wherein the means for developing the first control signal comprises a detector for detecting the presence of said first beat signal and for producing a first trigger signal when said first beat signal disappears, the means responsive to said first control signal including a circuit excited by said first trigger signal to effect the alternate operation of said fourth and fifth transmitters, the means for developing the second control signal comprising a detector for detecting the presence of said one beat signal and for producing a second trigger signal when said one beat signal disappears, the means responsive to said second control signal including a circuit excited by said second trigger signal to effect the alternate operation of said sixth and seventh transmitters.

22. The apparatus defined by claim 19 wherein said first, second, third and fourth intervals are substantially equal in duration.

References Cited by the Examiner

UNITED STATES PATENTS

| | | | |
|---|---|---|---|
| 2,872,676 | 2/1959 | Hunsicker | 343—105 |
| 3,136,995 | 6/1964 | Jolliffe et al. | 343—105 |
| 3,209,356 | 9/1965 | Smith | 343—105 |
| 3,214,759 | 10/1965 | Mahoney | 343—105 |

CHESTER L. JUSTUS, *Primary Examiner.*

H. C. WAMSLEY, *Assistant Examiner.*